(12) United States Patent
Akarapu et al.

(10) Patent No.: US 9,789,633 B2
(45) Date of Patent: Oct. 17, 2017

(54) METHOD AND SYSTEM FOR CRACK-FREE DRYING OF HIGH STRENGTH SKIN ON A POROUS CERAMIC BODY

(71) Applicant: Corning Incorporated, Corning, NY (US)

(72) Inventors: Ravindra Kumar Akarapu, Painted Post, NY (US); Derik Alan Bruins, Elmira, NY (US); Jacob George, Horseheads, NY (US); Amit Halder, Ithaca, NY (US); Charlotte Diane Milia, Corning, NY (US); Kaitlin Smith Olmstead, Elmira, NY (US)

(73) Assignee: Corning Incorporated, Corning, NY (US)

( * ) Notice: Subject to any disclaimer, the term of this patent is extended or adjusted under 35 U.S.C. 154(b) by 491 days.

(21) Appl. No.: 14/295,536

(22) Filed: Jun. 4, 2014

(65) Prior Publication Data

US 2015/0352748 A1    Dec. 10, 2015

(51) Int. Cl.
*F26B 3/34* (2006.01)
*B29C 35/04* (2006.01)
(Continued)

(52) U.S. Cl.
CPC .......... *B29C 35/04* (2013.01); *B28B 11/241* (2013.01); *B28B 11/243* (2013.01); *B28B 17/0081* (2013.01); *C04B 41/009* (2013.01); *C04B 41/5089* (2013.01); *C04B 41/85* (2013.01); *B29C 2035/0822* (2013.01);
(Continued)

(58) Field of Classification Search
CPC ............ B29C 35/04; B29C 2035/0822; B29C 2035/0855
See application file for complete search history.

(56) References Cited

U.S. PATENT DOCUMENTS 4,277,376 A    7/1981  Paolasini
4,863,712 A    9/1989  Twigg et al.
(Continued)

FOREIGN PATENT DOCUMENTS

CN    101328069 A    12/2008
CN    102674811      9/2012
(Continued)

OTHER PUBLICATIONS

The International Search Report and Written Opinion, dated Oct. 8, 2015, International Application No. PCT/US2015/034106, International Filing Date Jun. 4, 2015, pp. 1-12.

*Primary Examiner* — Galen Hauth
(74) *Attorney, Agent, or Firm* — Joseph M. Homa

(57) ABSTRACT

A method and system to dry crack-free and high strength skin including an inorganic binder of an average particle size ($D_{50}$) in a range between 10 nm and 700 nm on a porous ceramic body. The method includes supporting the honeycomb body on an end face such that axial channels and outer periphery are substantially vertical. A gas is flowed past the honeycomb body substantially parallel to the axial channel direction, substantially equally around the outer periphery of the skin, to uniformly dry the skin to form a partially dried skin under mild conditions. Then the partially dried skin may be dried more severely resulting in rapidly dried crack-free and high strength skin.

15 Claims, 6 Drawing Sheets

(51) Int. Cl.

| | | |
|---|---|---|
| *B28B 11/24* | (2006.01) | |
| *C04B 41/85* | (2006.01) | |
| *C04B 41/00* | (2006.01) | |
| *C04B 41/50* | (2006.01) | |
| *B28B 17/00* | (2006.01) | |
| *B29C 35/08* | (2006.01) | |
| *C04B 111/00* | (2006.01) | |

(52) U.S. Cl.
CPC ........... *B29C 2035/0855* (2013.01); *C04B 2111/00793* (2013.01); *F26B 2210/02* (2013.01)

(56) References Cited

U.S. PATENT DOCUMENTS

| | | | |
|---|---|---|---|
| 5,979,073 A | 11/1999 | Fuls et al. | |
| 6,365,259 B1 | 4/2002 | Brundage et al. | |
| 6,539,644 B1 | 4/2003 | Araya | |
| 6,725,567 B2 | 4/2004 | Yano et al. | |
| 6,932,932 B2 | 8/2005 | Miura et al. | |
| 7,976,769 B2 | 7/2011 | Fletcher et al. | |
| 8,518,857 B2 | 8/2013 | Bliss et al. | |
| 2007/0006480 A1* | 1/2007 | Ishii | B26B 3/04 34/265 |
| 2008/0116621 A1 | 5/2008 | Brennan et al. | |
| 2009/0294438 A1 | 12/2009 | Adrian et al. | |
| 2009/0294440 A1 | 12/2009 | Adrian et al. | |
| 2010/0151185 A1* | 6/2010 | Okazaki | C04B 41/5089 428/116 |
| 2010/0234216 A1 | 9/2010 | Ogunwumi et al. | |
| 2013/0224430 A1 | 8/2013 | Chapman et al. | |
| 2013/0298798 A1 | 11/2013 | Fernando et al. | |
| 2014/0147621 A1 | 5/2014 | Chapman et al. | |

FOREIGN PATENT DOCUMENTS

| | | |
|---|---|---|
| CN | 102701776 | 10/2012 |
| EP | 2168741 A2 | 3/2010 |
| JP | 4948249 | 6/2012 |
| JP | 5082342 | 11/2012 |
| KR | 1234445 | 2/2013 |

* cited by examiner

METHOD AND SYSTEM FOR CRACK-FREE DRYING OF HIGH STRENGTH SKIN ON A POROUS CERAMIC BODY

BACKGROUND

Field

Exemplary embodiments of the present disclosure relate to a method and system to dry crack-free and high strength skin on a porous ceramic body.

Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters (generically referred to herein as honeycomb bodies) may be used in these applications.

Particulate filters and substrates may be difficult to manufacture to external dimensional requirements set by original equipment manufacturers (OEMs) and the supply chain due to drying and firing shrinkage during manufacturing. Consequently, ceramic cement may be used to form an exterior skin of a honeycomb body which has been machined or "contoured" to a desired dimension. As used herein, the term "honeycomb body" includes single honeycomb monoliths and honeycomb bodies formed by multiple honeycomb segments that are secured together, such as by using a ceramic cement to form a monolith. Ceramic cement (skin cement) may be mixed and applied to a fired, contoured or segmented honeycomb body and the wet skin allowed to dry. The wet skin contains water (for example, 10%-35% by weight), and the skin needs to be dried prior to the formation of the final product (article). In some cases, the skin needs to be dried to greater than 98% dry (i.e., to having less than 2% of the original moisture content). The act or process of applying ceramic cement to the exterior of the honeycomb body is referred to herein as "skinning" the honeycomb body. A honeycomb body having skin disposed thereon is referred to herein as a "skinned" honeycomb body. As disclosed herein, contouring refers to grinding, machining, cutting, drilling, core drilling, etc. to a desired dimension.

Substrates and filters are currently skinned after firing and the skin dried using hot air in manufacturing. Skin drying cracks may arise during the skin drying process. Often skin drying cracks must be repaired by manual rework. The added labor and time for inspecting skinned honeycomb bodies and fixing of skin drying cracks leads to inefficiencies in product manufacturing. To avoid skin drying cracks a slow drying process is employed leading to additional product manufacturing inefficiencies.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a method to dry crack-free and high strength skin on a porous ceramic body.

Exemplary embodiments of the present disclosure also provide a system to dry crack-free and high strength skin on a porous ceramic body.

Additional features of the invention as claimed will be set forth in the description which follows, and in part will be apparent from the description, or may be learned by practice of the claimed invention.

An exemplary embodiment discloses a method of drying a skin disposed on an outer periphery of a porous ceramic honeycomb body having a first end face, a second end face, and axial channels and the outer periphery extending from the first end face to the second end face. The method includes supporting the honeycomb body on the first end face such that the axial channels and the outer periphery are substantially vertical. The method includes drying the skin under a first set of conditions comprising flowing a first gas vertically to the honeycomb body at a first velocity, wherein at least a portion of the first flowing gas passes substantially equally around the outer periphery of the skin disposed on the outer periphery of the honeycomb body to uniformly dry the skin to a first dryness forming a partially dry skin. The partially dried skin is dried to a second dryness under a second set of conditions different from the first set of conditions, wherein the skin comprises an inorganic binder comprising an average particle size ($D_{50}$) in a range between 10 nm and 700 nm.

An exemplary embodiment also discloses a system to dry a skin comprising an inorganic binder having an average particle size ($D_{50}$) in a range between 10 nm and 700 nm disposed on an outer periphery of a porous ceramic honeycomb body. The honeycomb body includes a first end face, a second end face, and axial channels and the outer periphery extending from the first end face to the second end face. The system includes a honeycomb support configured to support the honeycomb body on the first end face such that the axial channels and the outer periphery are substantially vertical, a blower, a heater, and a controller. The blower is configured to flow a first gas vertically to the honeycomb body at a first velocity, such that at least a portion of the first flowing gas passes substantially equally around the outer periphery of the skin disposed on the outer periphery of the honeycomb body to uniformly dry the skin to a first dryness forming a partially dry skin and a second gas vertically to the honeycomb body at a second velocity greater than the first velocity to dry the skin to a second dryness. The heater is configured to heat the first gas to a first temperature and the second gas to a second temperature greater than the first temperature. The controller is configured to control the blower to flow the first gas for a first time period and the second gas for a second time period.

It is to be understood that both the foregoing general description and the following detailed description are exemplary and explanatory and are intended to provide further explanation of the disclosure.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1A:
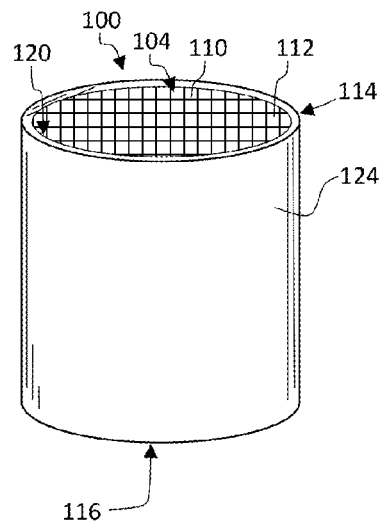
FIG. 1A shows a schematic perspective view of a honeycomb body comprising a skin on an outer periphery of a honeycomb core according to exemplary embodiments of the disclosure.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In these exemplary embodiments, the disclosed article, and the disclosed method of making the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "ml" for milliliters, and "RT" for room temperature, "nm" for nanometers, and like abbreviations).

Specific values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, and more specific values described herein.

As used herein, a green material is an unfired material comprising a mixture of inorganic and/or organic materials. The green material may include various inorganic filler materials, inorganic and/or organic binder materials, and liquid vehicle. The green material may be referred to herein as "wet" prior to drying. The green material may be dried to remove fluid content (e.g., water). Drying is often accomplished by allowing a part to sit exposed to the ambient atmosphere overnight, however, hot air, forced air, microwave, radio frequency (RF) or infrared radiation (IR) may be used to augment drying. The drying may be accomplished in humidity controlled air. Green material may include cold-set cements. The dried green material may be fired to form a porous or non-porous ceramic article.

As used herein, a "super addition" refers to a weight percent of a component, such as, for example, an organic binder, liquid vehicle, additive or pore former, based upon and relative to 100 weight percent of the inorganic components of the mixture.

Substrate and filter articles are used in gasoline and diesel, light duty and heavy duty vehicles for after treatment emission control, and which control satisfies environmental regulations. One of the steps in the production of these substrates and filters is the application of a cement-based skin or outer wall on the outer peripheral axial surface of the substrates and filters.

The skin on a part, such as a porous ceramic filter article, is the interface between the part and the surroundings. The skin serves several functions, for example, the skin adds to the aesthetics of the part and is valued by customers as an indicator of quality, protects the part's functional filter portion from structural degradation such as chipping damage, and other hazards surrounding the part, in manufacture and use, such as in handling and transport of the part, and adds to the isostatic strength of the part, which can be a significant performance metric for modern parts.

To reduce skin cracking during drying, a low evaporation rate may be used. A low evaporation rate at the skin surface to reduce moisture gradients may make the drying process slow with associated long drying times. However, a process of achieving fast crack-free skin drying according to exemplary embodiments as disclosed herein was surprisingly discovered that reduces the drying time. It was discovered that drying skin is susceptible to cracking until it reaches a critical dryness, for example, 25% dry where % dry is the ratio of the instant water content to the original water content of the skin ×100%. Beyond the critical dryness, for example, 25% dryness, skin is robust and does not crack even at a faster, harsher drying condition, for example, in a 90° C. environment, in contrast to slow ambient air drying. Additionally, it was surprisingly discovered that under the conditions of the process of achieving fast crack-free skin drying according to exemplary embodiments as disclosed herein, substantial migration of colloidal inorganic binders of the cement skin was prevented leading to stronger, more robust dried skin.

Figure 1B:
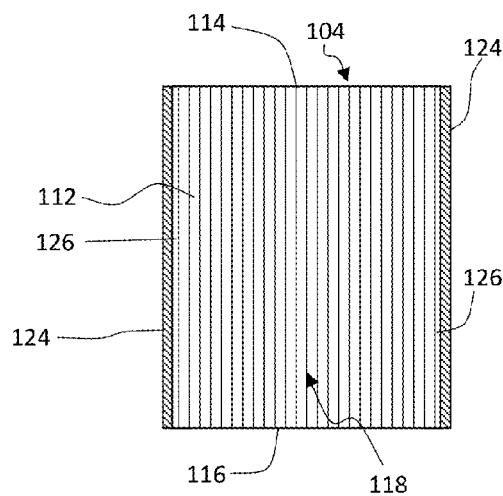
FIG. 1B is a schematic cross section through the honeycomb body of FIG. 1A according to these exemplary embodiments of the disclosure.
Figure 1C:
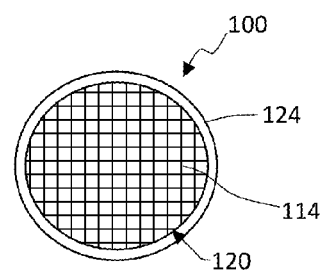
FIG. 1C is a schematic top view of the honeycomb body of FIG. 1A according to these exemplary embodiments of the disclosure.

FIG. 1A shows a honeycomb body 100 including a plurality of intersecting walls 110 that form mutually adjoining cell channels 112 extending axially between opposing end faces 114, 116. FIG. 1B shows a schematic cross section through the honeycomb body 100 of FIG. 1A. FIG. 1C shows a schematic top view of the honeycomb body 100 of FIG. 1A. "Cell" is generally used herein when referring to intersecting walls in cross section of the honeycomb body and "channel" is generally used when referring to a cell extending between the end faces 114, 116. Cell and channel may be used interchangeably as well as "cell channel". The top face 114 refers to the first end face and the bottom face 116 refers to the second end face of the honeycomb body 100 positioned in FIG. 1A, otherwise the end faces are not limited by the orientation of the honeycomb body 100. The top face 114 may be an inlet face and the bottom face 116 may be an outlet face of the honeycomb body 100 or the top face 114 may be an outlet face and the bottom face 116 may be an inlet face of the honeycomb body 100.

Cell density can be between about 100 and 900 cells per square inch (cpsi). Typical cell wall thicknesses can range from about 0.025 mm to about 1.5 mm (about 1 to 60 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 300/4, 600/4, 400/4, 600/3, and 900/2. As used herein, honeycomb body 100 is intended to include a generally honeycomb structure but is not strictly limited to a square structure. For example, hexagonal, octagonal, triangular, rectangular or any other suitable cell shape may be used. Also, while the cross section of the depicted cellular honeycomb body 100 is circular, it is not so limited, for example, the cross section can be elliptical, square, rectangular, other polygonal shape, or other desired shape.

In exemplary embodiments, the honeycomb bodies considered herein can have length L and diameter D dimensions that are not particularly limited. For example, the length L can be about 5 inches (12.7 cm) to about 20 inches (50.8 cm), and the diameter D can be about 3 inches (7.6 cm) to about 20 inches (50.8 cm). For example, the length L can be about 5 inches (12.7 cm) to about 15 inches (38.1 cm), for example, about 6 inches (15.2 cm) to about 13 inches (33 cm), or even for example, the length L can be about 5 inches (12.7 cm) to about 10 inches (25.4 cm) or about 10 inches to about 15 inches. In these exemplary embodiments a method of making a partial filter can include transversely cutting a honeycomb body in two resulting in a length L of about half of these lengths L mentioned herein, which are also included as example lengths L.

As mentioned, the honeycomb body diameter D is not particularly limited, and can be, for example, about 3 inches (7.6 cm) to about 20 inches (50.8 cm). For example, the diameter D can be about 5 inches (12.7 cm) to about 17 inches (43.2 cm), for example, about 7 inches (17.8 cm) to about 13 inches (33 cm). For example, the diameter D can be about 3 inches (7.6 cm) to about 10 inches (25.4 cm) or about 10 inches (25.4 cm) to about 20 inches (50.8 cm).

Figure 2:
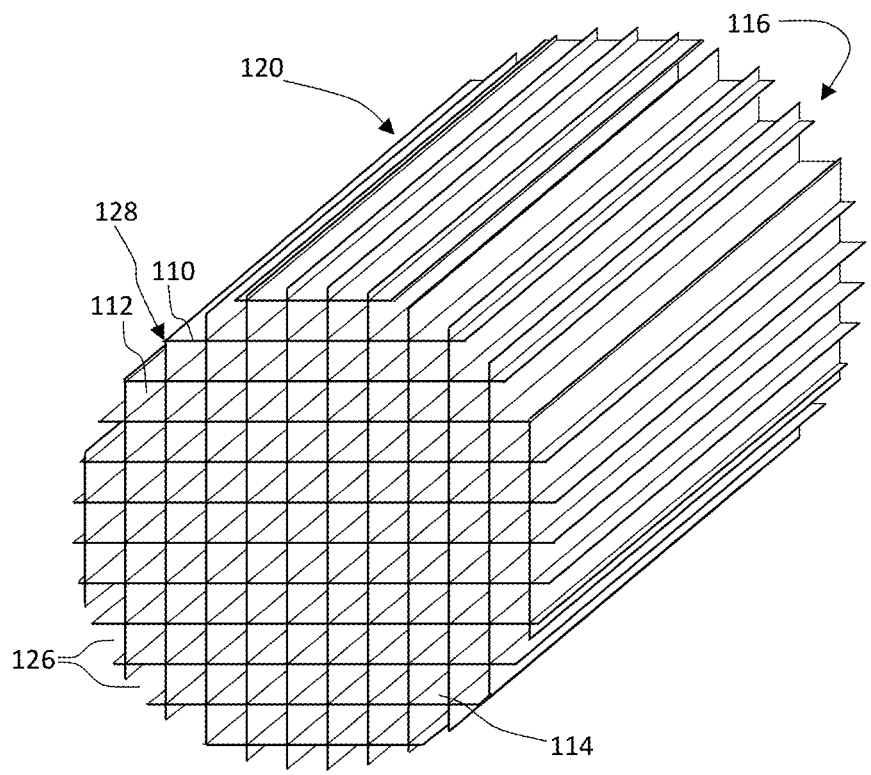
FIG. 2 shows a schematic perspective view of a honeycomb core comprising partial cells on an outer periphery thereof in a method according to exemplary embodiments of the disclosure.

The honeycomb body 100 generally has a honeycomb core 118 having an outer periphery 120 and a skin 124. The skin 124 may be applied after a contouring operation. FIG. 2 shows a schematic perspective view of an exemplary embodiment of a honeycomb core 118 after contouring and before skinning. The honeycomb core 118 may be green and dried before contouring and skinning or may be fired. The walls 110 at the outer most periphery 120 of the contoured honeycomb core 118 may form partial cells 126 as well as cells 112. The partial cells 126 are generally spaced outward from the cells 112. However, a cell 112 may be outer most when walls 110 forming the cell 112 meet at the outer periphery 120. The outer most portions of the walls 110 of the partial cells 126 and the outer most corner 128 of some cells 112 form the outer periphery 120 of the contoured honeycomb core 118.

Exemplary embodiments of the disclosure relate to ceramic articles having a honeycomb core 118 such as shown in FIG. 2, which may be formed of a single monolith or formed of segments cemented together to form a monolith. The honeycomb core 118 includes a plurality of channel walls 110 extending from an inlet face 114 to an outlet face 116 defining cell channels 112 and partial cell channels 126 therebetween, an outer periphery 120 extending from the inlet face 114 to the outlet face 116, where partial cell channels 126 adjoin the outer periphery 120 of the honeycomb core 118. A skin 124 is disposed on the outer periphery 120 of the honeycomb core 118 as shown in FIGS. 1A, 1B, and 1C to form a honeycomb body 100. While this disclosure relates to after-applied skins, such after-applied skins may be disposed on co-extruded skins.

In these exemplary embodiments the honeycomb core 118 may be formed from a ceramic material, such as cordierite or in other cases may be made of other ceramic materials, such as silicon carbide, silicon nitride, aluminum titanate, alumina and/or mullite, or combinations thereof.

The honeycomb body core 118 can be formed according to any conventional process suitable for forming honeycomb monolithic bodies. For example, a plasticized ceramic forming batch composition can be shaped into a green body by any known conventional ceramic forming process, such as extrusion, injection molding, slip casting, centrifugal casting, pressure casting, dry pressing and the like. Typically, honeycomb structures are formed by an extrusion process where a ceramic material is extruded into a green form before the green form is fired to form the final ceramic of the structure. In an exemplary embodiment, the extrusion can be performed using a hydraulic ram extrusion press, a two stage de-airing single auger extruder or a twin screw mixer with a die assembly attached to the discharge end. The extruded material can be cut to create honeycomb structures such as filter bodies shaped and sized to meet the needs of engine manufacturers. The extruded material can be honeycomb segments connected or bonded together to form the honeycomb structures. These extruded green bodies can be any size or shape.

Generally, as a ceramic honeycomb structure is extruded, a solid external surface is provided along the length of the structure. Under certain circumstances, however, it may become necessary to remove the external surface. For example, a green extruded honeycomb structure may be shaped to a desired shape and size by removing the extruded external surface. Alternatively, the green honeycomb structure may be fired and then ground to the desired shape and size by removing the external extruded surface and any portion of the porous wall structure necessary to attain the desired shape and size. Shaping can be accomplished by any means known in the art, including cutting, sanding or grinding away the outer extruded surface of the honeycomb structure to achieve the desired shape and size.

Likewise, honeycomb segments may be shaped to a desired shape and size by removing the extruded external surface before integrating to the honeycomb structure. Alternatively, the honeycomb segments may be integrated to form a honeycomb structure and the formed honeycomb structure shaped to the desired shape and size.

Once the desired shape and size has been attained, a skin material can be applied to an outer periphery of the sized body to form a new external surface, or skin, on the body. Typically, the ends of the honeycomb body are not covered with the skin material, although certain passages may be plugged if desired. The skin batch can be applied to the honeycomb core 118 by a doctor blade operation, by an axial skinning operation, by a spray casting operation, by a tape casting operation, or the like. The skin batch contacting the honeycomb core walls 110 bonds the skin batch layer to the honeycomb core 118 when the skin batch is cured forming the honeycomb body 100.

In exemplary embodiments, the skin on the honeycomb bodies considered herein can have applied skin thicknesses T that are not particularly limited. For example, the applied skin thickness T can be about 0.5 mm to about 2.1 mm. For example, the applied skin thickness can be about 0.5 to about 1.1 mm, about 1.0 mm to about 1.5 mm, or even about 1.4 mm to about 2.1 mm. When the applied skin is applied over an existing skin or the skin is a multi-layer skin, the total skin thickness can be about twice (2×) these applied skin thicknesses T mentioned herein, which are also included as example skin thicknesses T.

Once the skin composition has been applied to the honeycomb structure, the skin composition can be dried and/or calcined. In some embodiments a cold-set cement composition may be applied to the honeycomb structure. In some embodiments, the honeycomb core 118 over which the cement is applied comprises fired ceramic material. In other embodiments, the honeycomb core 118 comprises a green body or a calcined body. In some cases, final firing of the calcined honeycomb structure can take place during the catalyzation process.

Skin material disclosed herein can include those that set at a temperature of less than 200° C., such as a temperature of less than 100° C., further such as a temperature of less than 50° C., and further such as a temperature of about 20° C., including cement material that can be used in skinning processes employing "cold set" skins. In cold set skinning, only drying of the skinning mixture is required to form a seal of the channel walls of the honeycombs. When a cold set skinning process is employed, drying in a two step operation according to exemplary embodiments of the disclosure can accelerate drying and reduce skin drying cracks. In some cold set skinning processes, it is anticipated that final skin consolidation, including the removal of residual temporary binder bi-products and strengthening of the seals, can occur in the course of subsequent processing steps (e.g., in the course of catalyzation or canning) or during first use (e.g., in an exhaust system).

Skin compositions are described in U.S. patent application Ser. No. 13/770,104, filed on Feb. 19, 2013, the contents of which are incorporated herein by reference in their entirety. According to exemplary embodiments the skin composition may comprise an inorganic filler material and a crystalline inorganic fibrous material. In exemplary embodiments, the inorganic filler material comprises at least 10% of the total weight of the inorganic solid components of the cement mixture and the crystalline inorganic fibrous material comprises less than 25% of the total weight of the inorganic solid components of the cement mixture.

In certain exemplary embodiments, at least 50% by weight of the crystalline inorganic fibrous material has an aspect ratio (longest dimension divided by shortest dimension) of from 3:1 to 10:1, such as from 4:1 to 8:1. In certain exemplary embodiments, less than 10% by weight of the crystalline inorganic fibrous material has an aspect ratio of less than 3:1. In certain exemplary embodiments, less than 5% by weight of the crystalline inorganic fibrous material has an aspect ratio of less than 3:1. In certain exemplary embodiments, the average aspect ratio of the crystalline inorganic fibrous material is from 3:1 to 10:1, such as from 4:1 to 8:1, including about 5:1. All aspect ratio measurements herein are made using scanning electron microscopy (SEM) according to methods known to those skilled in the art, unless otherwise indicated.

In certain exemplary embodiments, the crystalline inorganic fibrous material has an average diameter of from 2 to 80 microns, such as from 5 to 50 microns, and further such as from 10 to 30 microns. The crystalline inorganic fibrous material can, in certain exemplary embodiments, have an average length of from 10 to 500 microns, such as from 50 to 400 microns, and further such as from 100 to 300 microns.

In certain exemplary embodiments, the crystalline inorganic fibrous material can comprise a finer fibrous material having an average diameter of from 2 to 10 microns and an average length of from 10 to 50 microns. The crystalline inorganic fibrous material may also comprise a relatively coarser fibrous material having an average diameter of from 20 to 60 microns and an average length of from 100 to 300 microns. The crystalline inorganic fibrous material may also comprise a fibrous material of intermediate coarseness, having an average diameter of from 10 to 20 microns and an average length of from 50 to 100 microns.

In certain exemplary embodiments, the crystalline inorganic fibrous material comprises a naturally occurring crystalline inorganic fibrous material. In certain exemplary embodiments, the crystalline inorganic fibrous material comprises an alkaline earth silicate, such as a naturally occurring alkaline earth silicate. An example of a suitable alkaline earth silicate is wollastonite ($CaSiO_3$), such as that available under the trade name Ultrafibe II, available from NYCO Minerals Incorporated, Willsboro, N.Y., USA.

In certain exemplary embodiments, the inorganic filler material comprises at least one of ground cordierite and fused silica glass powder.

In certain exemplary embodiments, the inorganic filler material comprises cordierite, such as ground cordierite.

In certain exemplary embodiments, the inorganic filler material comprises glass powder, such as fused silica glass powder.

The glass powder filler material can have a median particle size (D50) between 10 and 20 µm, with, for example, a minimum particle size between 7 µm and 75 µm and a maximum particle size between 50 µm and 70 µm. Particle size was determined as a mass-based equivalent spherical diameter. The glass powder filler material may comprise, for example, from 60% to 80% by weight of the total inorganic components of the cement. Suitable silica powder filler materials are available, for example, under the trade name Teco-Sil, available from CE Minerals of Tennessee Electro Minerals Incorporated, Tennessee, USA. All particle size measurements herein were made with a Microtrac Inc. particle size analyzer, unless otherwise indicated.

In another embodiment, the skin 124 of the honeycomb structure 100 may comprise an amorphous glass-based cement, the cement formed from a composition comprising a first (fine) glass powder as a low thermal expansion filler material, a second (coarse) glass powder as a low thermal expansion filler material, a crystalline inorganic fibrous material, a binder and a solvent or vehicle for carrying the solid constituents of the glass-based cement. In certain exemplary embodiments, the glasses of both the first glass powder filler material and the second glass powder filler material are amorphous fused silica having particle sizes greater than about 1 micron. The distribution of glass powder filler material particle size may be multimodal in that a distribution of the glass powder filler material with particle sizes greater than about 1 micron exhibits multiple modes (local maximums) of particle sizes. In one embodiment, the amorphous glass-based cement comprises a bimodal particle size distribution of amorphous glass particles with a particle size greater than about 1 micron. The glass based cement may include a first glass powder filler material wherein a median (D50) particle size of the first glass powder filler material can be in a range from about 10 microns to about 50 microns, from about 15 microns to about 50 microns, from about 20 microns to about 45 microns or from about 30 microns to about 45 microns, with a D10 in a range from about 1 micron to about 10 microns and D90 in a range from about 25 microns to about 125 microns. A median (D50) particle size of the second glass powder filler material can be in a range from about 150 microns to about 300 microns, in a range from about 150 microns to about 250 microns, in a range from about 170 microns to about 230 microns, in a range from about 180 microns to about 220 microns, with D10 in a range from about 100 microns to about 150 microns, and D90 in a range from about 250 microns to about 350 microns. Particle sizes are determined as a mass-based equivalent spherical diameter. As used herein, the term D50 represents the median of the distribution of particle sizes, D10 represents the particle size in microns for which 10% of the distribution are smaller than the particle size, and D90 represents the particle size in microns for which 90% of the distribution are smaller than the particle size. All particle size measurements herein are made with a Microtrac Inc. particle size analyzer, unless otherwise indicated.

To provide the cement compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel® is a suitable organic binder. Methocel® A4 is a water-soluble methyl cellulose polymer binder available from Dow Chemical™. The organic binder material may, for example, be present in the cement composition in an amount of from 0.1% to 10% by weight, such as from 0.2% to 5%, and further such as from 0.5% to 2%.

A suitable inorganic binder may comprise colloidal silica or alumina comprising nanometer-scale silica or alumina particles suspended in a suitable liquid, such as water. For example, the nanometer-scale silica or alumina particles may have an average particle size ($D_{50}$) in a range of 10 nm to 700 nm. The inorganic binder material may, for example, be present in the cement composition in an amount less than about of from 2% to 35% of the total weight of inorganic solids present in the cement, and in some embodiments inorganic binders are present in an amount of from 5% to 30%, and in certain other embodiments in an amount of from 10% to 25%. Suitable colloidal silica binder material is Ludox® HS-40 and Ludox® PW50EC produced by W.R. Grace™. Typical colloidal binder materials may comprise approximately 40% by weight solid material as a suspension in a deionized water vehicle.

An additional aspect to the skin cement mixtures according to this disclosure relates to the rheological or process stability of the skin cement. The same characteristic that enable migration of methylcellulose and colloidal silica into the substrate during skinning (e.g., creating a bond) can negatively impact skin processibility due to high slip casting and syneresis rates during skin cement processing and application. In order to limit this effect a hydrated magnesium aluminum silicate for example Veegum Pro® or the superaddition of a poly disperse colloidal silica for example Ludox® PW50EC in combination with methylcellulose can be used to modify the liquid component viscosity and slip cast rate during skin application while still resulting in a well bonded skin.

Ludox® PW50EC, a polydisperse colloidal silica, has a much broader particle size range than the small silica particle size of Ludox® HS-40. Ludox® PW50EC has a particle size range $D_{50}$ of approximately 10-100 nm particle size distribution (PSD) as compared to about 12 nm $D_{50}$ in Ludox® HS-40. In theory, the larger particles of Ludox®

PW50EC do not migrate as easily leaving them dispersed and in the bulk cement mixture. The smallest of the particles in the Ludox® PW50EC are still able to migrate and migrate into the substrate.

Typically, the preferred liquid vehicle or solvent for providing a flowable or paste-like consistency has included water, such as deionized (DI) water, although other materials may be used. The liquid vehicle content may be present as a super addition in an amount equal to or less than about 30% of the total weight of the inorganic components of the cement mixture, such as a range of from about 10% to about 25% of the total weight of the inorganic components of the cement mixture. However, the liquid vehicle is typically adjusted to obtain a viscosity suitable to make the cement easy to apply.

In some embodiments, the cement may optionally further contain organic modifiers, such as adhesion promoters for enhancing adhesion between the cement and the honeycomb body. For example, Michem® 4983 has been found suitable for this purpose.

Table 1 below sets forth examples of eight different batches of different cement mixtures (excluding water), each cement mixture containing: (i) an amorphous fused silica filler material with a particle size greater than 1 micron and a coefficient of thermal expansion from 25° C. to 600° C. of less than $5 \times 10^{-7}1°$ C.; and (ii) a crystalline inorganic fibrous material (wollastonite) with an average aspect ratio of from 4:1 to 8:1 and a coefficient of thermal expansion of greater than $50 \times 10^{-7}1°$ C.; where the weight percent for the first silica powder filler material and the crystalline inorganic fibrous material are expressed as a percent of the total inorganic components of the cement.

ness (e.g, 20-30% dry). The second operation involves drying the skin to completion (e.g., 90-100% dry) at a rapid rate, thereby conducting the overall drying process in a shorter period of time than ambient drying and with fewer cracks than with heated drying.

Figure 3:
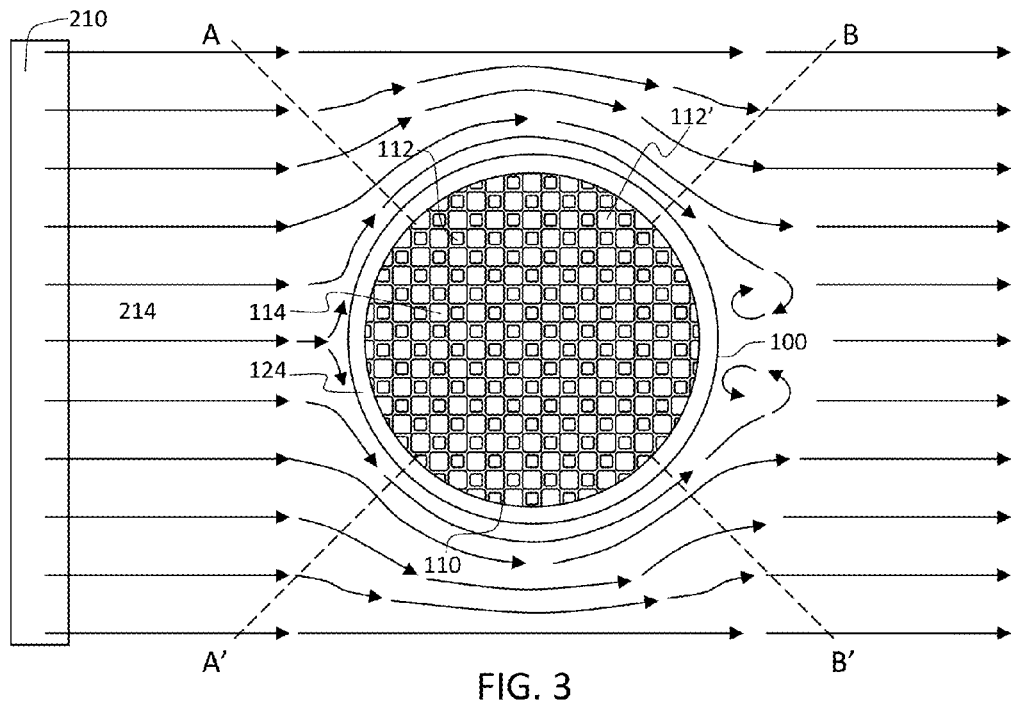
FIG. 3 is a schematic top view of a comparative method of flowing air to a porous ceramic honeycomb body having a skin disposed on the outer periphery to dry the skin.

FIG. 3. shows a schematic top view of a comparative method of flowing air to a porous ceramic honeycomb body 100 having a skin 124 disposed on the outer periphery 120 to dry the skin. In the comparative embodiment, blower 210 blows air 214 at a side A-A' of the skinned honeycomb body 100. In this instance side A-A' facing the blowing air 214 will experience more rapid drying than downwind side B-B' resulting in moisture gradients and incidences of skin drying cracking. In contrast, FIGS. 4 and 5 illustrate schematic views of a method of uniformly flowing air to a porous ceramic honeycomb body having skin disposed on the outer periphery to dry the skin according to an exemplary embodiment of the disclosure.

Figure 4:
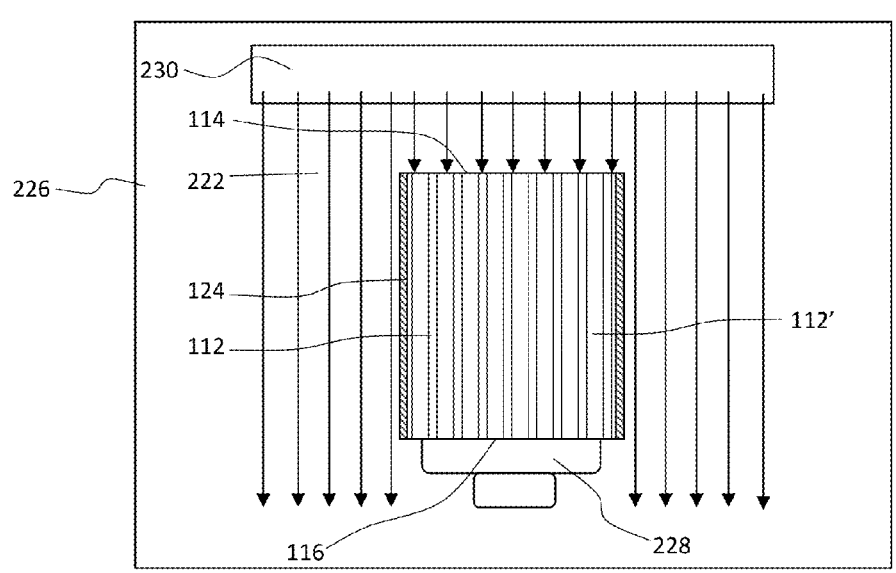
FIG. 4 illustrates a side cross-sectional schematic of a system and method of flowing air to a porous ceramic honeycomb body having skin disposed on the outer periphery to dry the skin according to an exemplary embodiment of the disclosure.
Figure 5:
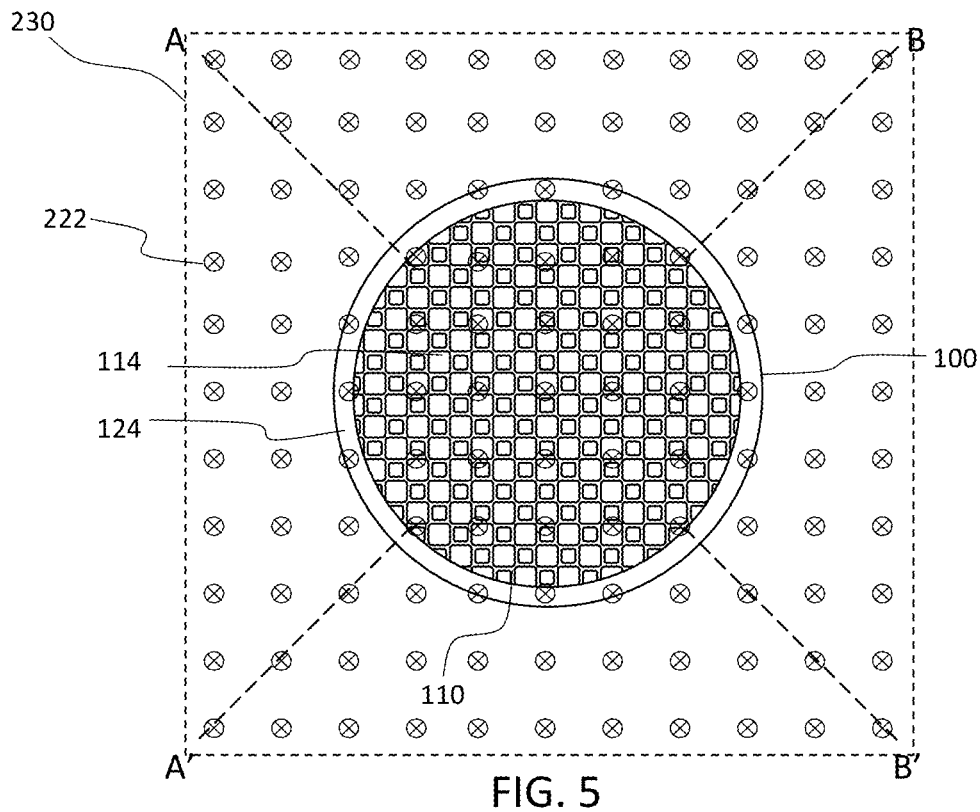
FIG. 5 is a schematic top view of a system and method of flowing air to a porous ceramic honeycomb body having a skin disposed on the outer periphery to dry the skin according to an exemplary embodiment of the disclosure.

FIG. 4 illustrates a side cross-sectional schematic view of a method of flowing air 222 axially past the skin 124 disposed on the outer periphery to uniformly dry the skin according to an exemplary embodiment of the disclosure. In FIG. 4 the air flow 222 is substantially parallel to the channels 112 and 112'. FIG. 5 is a schematic top view of the method of flowing air 222 past the skin 124 disposed on the outer periphery to uniformly dry the skin. The x's indicate air flow into the page. As can be seen in FIGS. 4 and 5, all portions of the outer periphery of the skin 124 A-A', A-B, B-B', and B'-A' are subjected to substantially the same axial air flow 222.

TABLE 1

| Component | Batch 1 wt % | Batch 2 wt % | Batch 3 wt % | Batch 4 wt % | Batch 5 wt % | Batch 6 wt % | Batch 7 wt % | Batch 8 wt % |
|---|---|---|---|---|---|---|---|---|
| Fused silica (C-E Minerals -200F) | 38.1 | 36.3 | 33.2 | 30.5 | 20.8 | 19.7 | 34.9 | 20.5 |
| Fused silica (C-E Minerals 80X105) | 38.1 | 36.3 | 33.2 | 30.5 | 48.6 | 45.9 | 34.9 | 47.9 |
| Wollastonite (NYCO Ultrafibe II) | 0.0 | 3.6 | 9.9 | 15.2 | 6.9 | 6.6 | 7.0 | 6.8 |
| Methylcellulose (Dow A4M) | 0.8 | 0.8 | 0.8 | 0.8 | 0.8 | 0.7 | 0.8 | 0.8 |
| Colloidal silica (Grace Ludox HS-40) | 23 | 22.9 | 22.9 | 23 | | 20.5 | 21.8 | |
| Colloidal silica (Grace Ludox PW-50EC) | | | | | 22.9 | 6.6 | | 22.6 |
| Magnesium aluminum silicate clay (RT Vanderbilt Veegum Pro) | | | | | | | 0.8 | |
| 11.6% magnesium acetate tetrahydrate solution | | | | | | | | 1.4 |

According to exemplary embodiments, a method is disclosed to dry skin using hot air such that the skin is crack-free and the colloidal inorganic binder remains uniformly dispersed throughout the thickness of the skin. The uniformly dispersed colloidal inorganic binder provides greater strength in the dried skin. The skin drying method disclosed reduces the colloidal inorganic binder migration.

According to these exemplary embodiments, the method includes two operations to reduce steep moisture gradients. Steep moisture gradients have been discovered to lead to skin drying cracks. The first operation involves drying the skin uniformly in a temperature and humidity controlled environment until the skin is dried beyond its critical dry- Utilizing uniform vertical drying a dryness beyond which there was no skin drying cracking was surprisingly discovered. The dryness beyond which there is no skin drying cracking is referred to herein as critical dryness. Critical dryness was determined by drying skin of skinned honeycomb bodies to various levels in ambient air (room temperature, for example, at about 20 to 25° C., at normal levels of humidity, for example, between about 40% and 60% humidity) for various time intervals. The gentle drying under ambient air conditions was followed by more extreme (harsh) drying conditions. For example, two harsh drying conditions utilized included: 1) a low temperature and high air velocity condition, which introduced a moisture gradient in the axial direction of the drying skin and 2) a high temperature and high air velocity condition, which introduced a moisture gradient through the skin thickness direction of the drying skin.

Figure 6:
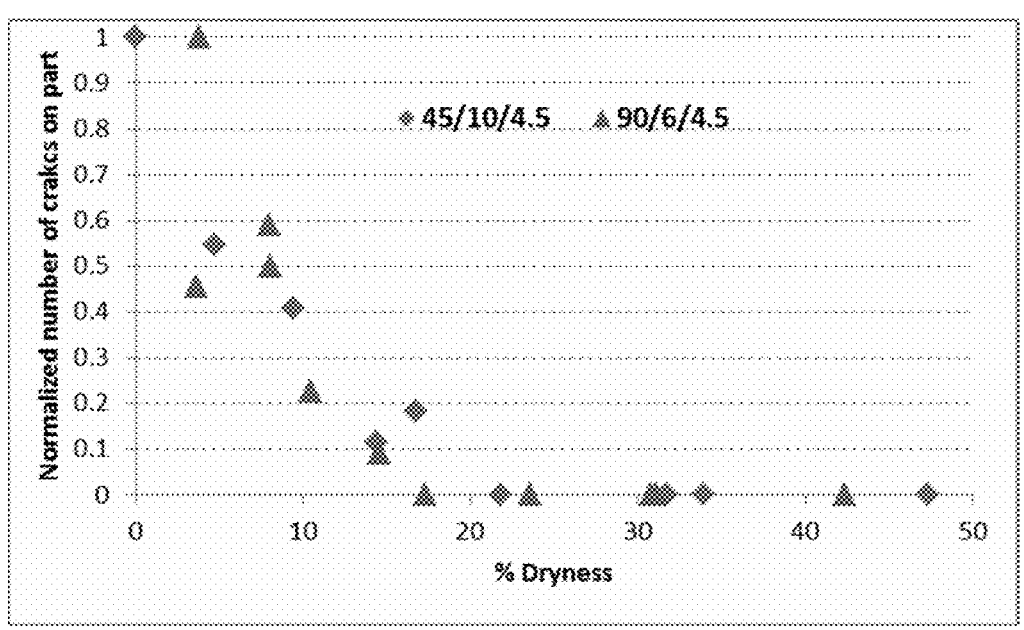
FIG. 6 is a graphical plot of data showing crack level as a function of dryness.

It was discovered that once the skin on the skinned honeycomb bodies having a composition as presented in Table 1 dried to about 22% in ambient air, the skin did not crack upon further drying even in the harshest of drying conditions. Accordingly, the critical dryness was found to be about 22% dry. Advantages of exemplary embodiments disclosed herein can guide designing drying zones in a dryer. A first zone can be designed to have a mild (gentle) condition to dry the skin on the skinned honeycomb body to the critical dryness or just greater than the critical dryness. Subsequent zone or zones can be designed to have a harsh (extreme) condition to dry the skin on the skinned honeycomb body to complete dryness. The harsh condition after critical dryness speeds the drying process without introducing skin drying cracks. FIG. 6 is a graphical plot of experimental data showing crack level as a function of dryness.

In FIG. 6, the diamond data points represent a drying condition of 45° C., 10% RH (percent relative humidity), and a vertical air flow velocity of 4.5 m/s. The triangle data points represent a drying condition of 90° C., 6% RH, and a vertical air flow velocity of 4.5 m/s. The honeycomb body of the samples used in FIG. 6 was a porous ceramic cordierite honeycomb body that had a diameter D of about 12 inches (30.5 cm) and a length L of about 6 inches (15.2 cm). The honeycomb body geometry was 300 cells per square inch (cpsi) and a wall thickness of about 4 mil (10 mm) (300/4). The honeycomb body of the samples had an applied skin thickness T of about 1 mm. The batch composition of the skin cement on the samples used in FIG. 6 is given in Table 2.

TABLE 2

| Component | Percent of Silica (C + F) | Percent of Dryblend | Percent of Total |
| --- | --- | --- | --- |
| Fused silica (C-E Minerals 80 × 105) | 70.0% | 62.7% | 40.6% |
| Fused silica (C-E Minerals - 200 F.) | 30.0% | 26.8% | 17.4% |
| Wollastonite (NYCO Ultrafibe II) | 10.0% | 8.9% | 5.8% |
| Methylcellulose (Dow A4M) | 1.7% | 1.5% | 1.0% |
| Colloidal silica (Grace Ludox PW-50EC) (includes water) | 33.3% | 29.8% | 19.3% |
| DI water | 27.5% | 24.6% | 15.9% |
| Dryblend | | | 64.7% |
| Ludox | | | 19.3% |
| Water | | | 15.9% |
| Solids | | | 74.4% |
| Water | | | 25.6% |

According to exemplary embodiments gentle drying conditions to provide minimum moisture gradients below critical dryness can include a vertical airflow in an axial direction to provide a uniform airflow around the periphery of the skinned honeycomb body, a high air velocity to provide fast skin drying, controlled relative humidity and a mild temperature to provide fast skin drying. The air velocity can be in a range of about 2.0 m/s to about 6.0 m/s past the outer periphery of the skin. When the air velocity is below about 2.0 m/s drying times may be too long. For example, the air velocity can be in a range of about 3.0 m/s to about 5.0 m/s past the outer periphery of the skin, for example, about 4 m/s.

The controlled relative humidity can offset moisture gradients in the skin created by the air flow. In these exemplary embodiments, the relative humidity may be controlled in a range of about 10% to about 40% relative humidity. For example, the relative humidity may be controlled in a range of about 20% to about 30% relative humidity. When the relative humidity is below about 10%, moisture gradients and associated drying cracks may develop. When the relative humidity is above about 40% drying times may be too long.

The controlled mild temperature at the outer periphery of the skin may be in a range of about 40° C. to about 60° C. according to these exemplary embodiments, for example, in a range of about 50° C. to about 60° C., or about 60° C. When the temperature is below about 40° C. drying times may be too long. When the temperature is above about 60° C. moisture gradients and associated drying cracks may develop.

Experiments were conducted based on these exemplary embodiments to determine the impact of temperature at high air velocity on skin drying cracking and the findings are presented in Table 3. In the experiments part geometries of 300/4, diameter D of about 12 inches (30.5 cm) and a length L of about 6 inches (15.2 cm) having wet skin composition as presented above in Table 2 with about 1 mm applied skin thickness T were dried in an oven having temperature, relative humidity, air speed, and air flow direction control. The oven was loaded with six skinned honeycomb bodies at a time.

TABLE 3

| | Vertical Air flow | | | Normalized | | |
| --- | --- | --- | --- | --- | --- | --- |
| | Temp (° C.) | Humidity (%) | Air speed (m/s) | Initial Evaporation rate | # of cracked parts out of 6 parts* | # of cracks per cracked part* |
| 1 | 40 | 10 | 4.5 | 1.08 | 6 | 7.5 |
| 2 | 60 | 10 | 4.5 | 2.68 | 4, 6 | 2, 8 |
| 3 | 70 | 10 | 4.5 | 4.05 | 1, 1 | 1, 1 |
| 4 | 90 | 6 | 4.5 | 9.02 | 4, 2 | 3.3, 5.5 |

*Repeat results are separated by a comma (e.g., 2, 4 means first run gave 2 and repeat run gave 4 as output).

Table 3 shows that the drying skin cracks rather severely at low temperatures and the cracking rate surprisingly decreases with increase in drying temperature. For example, all the parts exhibited skin drying cracks at 40° C. drying temperature with approximately 7.5 cracks per part, while only one part out of six exhibited skin drying cracks at 70° C. drying temperature exhibiting only one crack. This surprisingly showed that temperature was not the dominant cause for skin drying cracks. While not wishing to be bound by theory, the reason for cracking appeared to be due to the stress development from non-uniform drying of the skin surface due to air velocity. The mass transfer coefficient due to air flow is at a maximum near the upwind end face closest to the air blower and decreases away from the upwind end face. Therefore, the skin near the upwind end face (at the top) dries out faster than the rest of the skin and a moisture gradient is formed in the axial direction leading to skin drying cracks.

At low temperatures, heat does not contribute significantly toward rapid evaporation. Therefore, the non-uniformity (moisture gradient) created by air flow velocity can be severe. On the other hand, at moderately higher temperatures, heat, presumably distributed uniformly around the skin outer periphery, contributes more significantly towards evaporation and therefore relaxes the moisture gradient created by the air flow velocity. Therefore, the cracking rate was observed to decrease at 70° C.

At very high temperatures (e.g., approximately 90° C. for these batch compositions), the evaporation rate is extremely high (evaporation rate at 90° C. is 9 times that at 40° C.). The outer periphery skin surface dries out quickly but the migration of water from the depth of the skin to the surface (skin thickness direction) cannot keep pace with the high evaporation rate. Therefore, a moisture gradient along the depth of the skin is created which results in cracking.

Experiments were conducted based on the exemplary embodiments disclosed herein to determine the impact of air flow velocity on skin drying cracking and the findings are presented in Table 4.

TABLE 4

| | Vertical Air flow | | | Normalized | | |
|---|---|---|---|---|---|---|
| | Temp (° C.) | Humidity (%) | Air speed (m/s) | Initial Evaporation rate | # of cracked parts out of 6 parts | # of cracks per cracked part |
| 10 | 40 | 10 | 0.5 | 0.36 | 2, 0 | 2, 0 |
| 11 | 60 | 50 | 0.5 | 0.5 | 0 | 0 |
| 12 | 60 | 10 | 0.5 | 0.89 | 0 | 0 |

On comparing data in Tables 2 and 3, it was surprisingly found that air flow velocity was an influential parameter in crack performance. Reducing the air flow velocity from 4.5 m/s to 0.5 m/s reduced the number of cracks significantly. Skin drying was more uniform in the axial direction at low velocity leading to reduced skin drying cracks. A disadvantage with low air flow velocity was that the drying times were long, for example, more than 2 hours.

Experiments were conducted based on these exemplary embodiments to determine the impact of relative humidity on skin drying cracking and the findings are presented in Table 5.

TABLE 5

| | Vertical Air flow | | | Normalized | | |
|---|---|---|---|---|---|---|
| | Temp (° C.) | Humidity (%) | Air speed (m/s) | Initial Evaporation rate | # of cracked parts out of 6 parts | # of cracks per cracked part |
| 5 | 40 | 50 | 4.5 | 0.6 | 0 | 0 |
| 6 | 50 | 30 | 2.5 | 1 | 0, 0 | 0, 0 |
| 7 | 50 | 30 | 4.5 | 1.34 | 0 | 0 |
| 8 | 60 | 30 | 4.5 | 2 | 0 | 0 |
| 9 | 60 | 50 | 4.5 | 1.49 | 0 | 0 |

Table 5 shows that higher humidity relaxes the moisture gradient created by air flow velocity. Surprisingly, no skin drying cracks were observed at higher humidity levels.

Experiments were conducted based on these exemplary embodiments to determine the impact of air flow direction on skin drying cracking and the findings are presented in Table 6.

TABLE 6

| | Horizontal Air flow | | | # of | |
|---|---|---|---|---|---|
| | Temp (° C.) | Humidity (%) | Air speed (m/s) | cracked parts out of 6 parts | # of cracks per cracked part |
| 1 | 40 | 10 | 4.5 | 6 | 19.5 |
| 2 | 40 | 50 | 4.5 | 3 | 11 |

TABLE 6-continued

| | Horizontal Air flow | | | # of | |
|---|---|---|---|---|---|
| | Temp (° C.) | Humidity (%) | Air speed (m/s) | cracked parts out of 6 parts | # of cracks per cracked part |
| 3 | 60 | 10 | 4.5 | 6 | 19.67 |
| 4 | 60 | 50 | 4.5 | 1 | 5 |
| 5 | 50 | 30 | 2.5 | 3 | 11 |
| 6 | 90 | 6 | 4.5 | 6 | 19.1 |
| 7 | 70 | 10 | 4.5 | 6 | 13.83 |

As evident from Table 6, horizontal air flow is more severe than vertical air flow. In horizontal air flow, the region facing the air flow dries out more quickly than the other side (blind spot where the air velocity can be significantly smaller). Most of the skin drying cracks appeared on the side facing the air flow. Increase in humidity decreased number of skin drying cracks per part but did not completely eliminate skin drying cracks. Similarly, reducing velocity also reduced number of skin drying cracks but did not eliminate skin drying cracks completely while increasing drying time.

According to exemplary embodiments the harsh drying conditions to provide rapid skin drying after the skin is dried beyond the critical dryness can include a vertical airflow in an axial direction to provide a uniform airflow around the periphery of the skinned honeycomb body, a high air velocity to provide fast skin drying, controlled relative humidity and a high temperature to provide fast skin drying. The air velocity can be in a range of about 1.0 m/s to about 7.0 m/s past the outer periphery of the skin. Generally, the air flow velocity under the harsh drying conditions can be greater than the air flow velocity under the gentle drying conditions to decrease drying time. For example, the air flow velocity under the harsh drying conditions can be in a range of about 2.0 m/s to about 6.0 m/s past the outer periphery of the skin, for example, in a range of about 4.0 m/s to about 5.0 m/s. The harsh drying conditions can also include microwave radiation, radio frequency (RF) radiation and infrared (IR) radiation to dry the skin to the second dryness The controlled relative humidity under these harsh drying conditions beyond the critical dryness in these exemplary embodiments can be controlled in a range of about 5% and about 40% relative humidity. For example, the relative humidity may be controlled in a range of about 10% and about 30% relative humidity. The controlled high temperature at the outer periphery of the skin may be in a range of about 60° C. to about 150° C. according to these exemplary embodiments, for example, in a range of about 70° C. to about 140° C., or in a range of about 90° C. to about 110° C.

Figure 7:
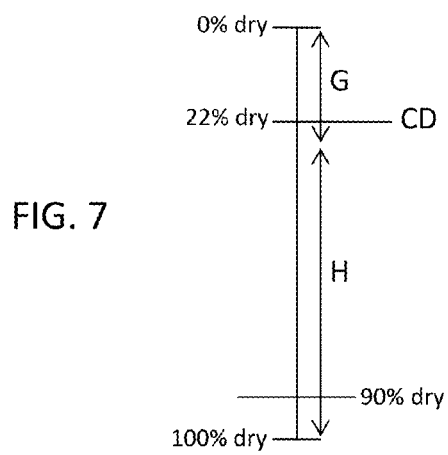
FIG. 7 is a graphical representation of a two-step method to dry the skin according to an exemplary embodiment of the disclosure.

FIG. 7 is a graphical representation of the two-step method to dry the skin according to the exemplary embodiments of the disclosure. In FIG. 7, "G" represents the first (gentle) drying operation from about 0% dry to the critical dryness ("CD"). The gentle drying operation can continue beyond the critical dryness to avoid skin drying cracks while not extending drying time significantly. For example, when a drying zone of a drying oven is set to dry a skin beyond the critical dryness. The gentle drying operation can continue until the skin is between about 20% dry and 50% dry to avoid skin drying cracks. For example, the gentle drying operation can dry the skin on the honeycomb body to 20% dry when the critical dryness is less than or equal to 20% dry, 30% dry when the critical dryness is less than or equal to 30% dry, 40% dry when the critical dryness is less than or equal to 40% dry, or even 50% dry when the critical dryness is less than or equal to 50% dry. The second (harsh) drying operation "H" can begin after the skin on the honeycomb body has dried beyond the critical dryness until the skin is 80% dry, 90% dry, or even 100% dry.

In these exemplary embodiments, the gentle drying operation can continue until the skin is between about 20% dry and 50% dry and the harsh drying operation can dry the skin to between about 80% dry and 100% dry.

In these exemplary embodiments, to dry the skin on the honeycomb body, drying the skin under the gentle drying operation can continue for less than about 120 minutes and drying the skin under the harsh drying operation can continue for less than about 120 minutes. For example, drying the skin under the gentle drying operation can continue for less than about 30 minutes and drying the skin under the harsh drying operation can continue for less than about 30 minutes. Surprisingly, under these exemplary conditions the skin can be about 100% dry in about 60 minutes without skin drying cracks.

Figure 8A:
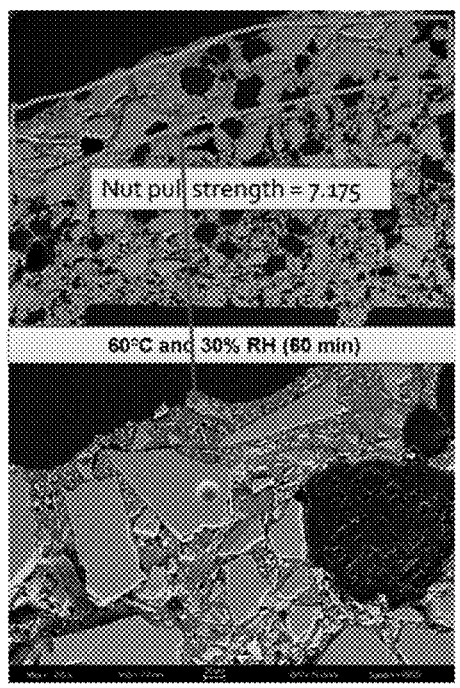
FIG. 8A is a scanning electron microscope (SEM) micrograph of skin dried under mild conditions according to exemplary embodiments of the disclosure.

In addition, honeycomb body skins comprising colloidal inorganic binders exhibit a greater strength, measured using a nut-pull strength, when dried according to these exemplary embodiments. FIG. 8A is a scanning electron microscope (SEM) micrograph of skin dried under mild conditions according to exemplary embodiments of the disclosure. The mild condition corresponding to 60° C. at 30% relative humidity resulted in lower levels of colloidal silica migration to the outer skin surface compared to the comparative harsh condition corresponding to a higher strength. Colloidal silica migration is indicated by box "C". The nut-pull strength was 7.175 lbf (pound force).

Figure 8B:
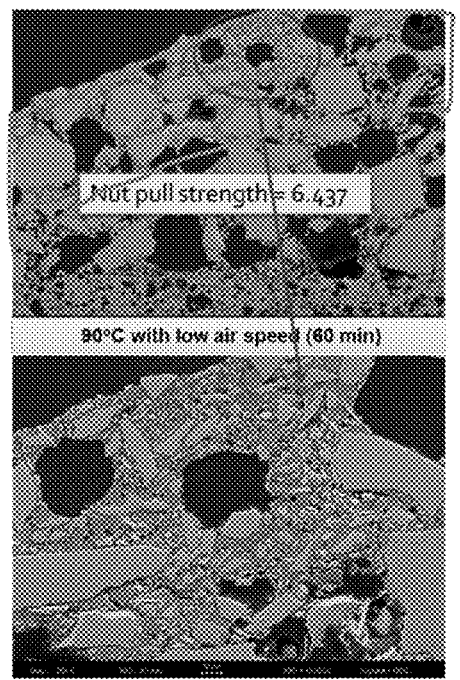
FIG. 8B is a SEM micrograph of skin dried under harsh conditions according to a comparative example method.

FIG. 8B is a SEM micrograph of skin dried under harsh conditions according to a comparative example method. The harsh condition corresponding to 90° C. resulted in higher levels of colloidal silica migration to the outer skin surface compared to the exemplary gentle condition corresponding to a lower strength. Colloidal silica migration is indicated by box "D". The higher levels of colloidal silica migration to the outer skin surface resulted in a lower nut-pull strength of 6.437 lbf.

According to exemplary embodiments, a system is disclosed to dry skin using hot air such that the skin is crack-free and the colloidal inorganic binder remains uniformly dispersed throughout the thickness of the skin. The skin drying system disclosed reduces the colloidal inorganic binder migration and reduces skin drying cracks.

Figure 9:
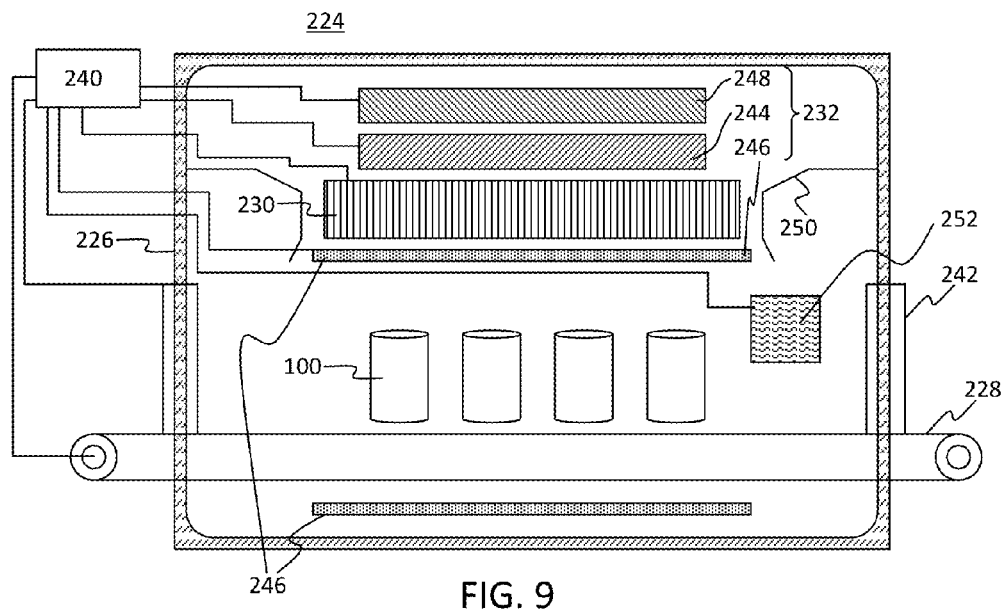
FIG. 9 illustrates a side cross-sectional schematic of a system and method of flowing air to a porous ceramic honeycomb body having skin disposed on the outer periphery to dry the skin according to an exemplary embodiment of the disclosure.
Figure 10:
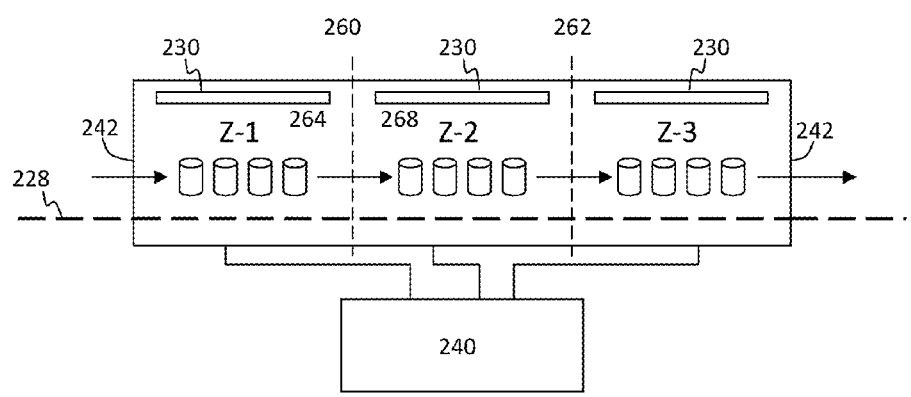
FIG. 10 illustrates a side cross-sectional schematic of a three zone system and method of flowing air to a porous ceramic honeycomb body having skin disposed on the outer periphery to dry the skin according to an exemplary embodiment of the disclosure.

Referring back to FIGS. 4 and 5, and additionally to FIGS. 9 and 10, an exemplary embodiment of the system 224 can include a chamber 226, a honeycomb support 228, a blower 230, a heater 232, and a controller 240. The chamber 226 may be an insulated housing such as an oven and include doors or curtains 242 to provide a drying environment. The chamber may have two or more drying zones Z-1, Z-2, Z-3 as illustrated schematically in FIG. 10. The drying zones Z-1, Z-2, Z-3 may have curtains or doors to isolate the drying environments from adjoining drying zones Z-1, Z-2, Z-3.

The honeycomb support 228 is configured to support the honeycomb body 100 having the wet skin 124 on an end face 116 such that the axial channels 112, 112' of the honeycomb body 100 and the outer periphery 120 are substantially vertical. The honeycomb support 228 can be a platen, stage, tray, conveyor, and the like, to support the honeycomb body 100 in chamber 226. The honeycomb support 228 can be controlled by the controller 240 to support and move skinned honeycomb body 100, for example, through successive drying zones Z-1, Z-2, Z-3, or in and out of chamber 226. The honeycomb support 228 may support one honeycomb body 100 or a plurality of honeycomb bodies 100.

In these exemplary embodiments the blower 230 can be configured to flow air vertically to the honeycomb body at a controllable velocity, such that at least a portion of the flowing air passes substantially equally around the outer periphery of the skin 124 disposed on the outer periphery of the honeycomb body 100 to uniformly dry the skin. The blower 230 can be controlled by the controller 240 to flow a first gas vertically to the honeycomb body at a first velocity to uniformly dry the skin to a first dryness forming a partially dry skin and to flow a second gas vertically to the honeycomb body at a second velocity greater than the first velocity to dry the skin to a second dryness. For example, the first dryness is equal to or drier (greater) than the skin critical dryness. For example, the first and second gases can be air or other gas such as nitrogen, humidity controlled air, and the like. For example, the first gas can be air at a first temperature and first relative humidity and the second gas can be air at a second temperature greater than the first temperature and a second relative humidity less than the first relative humidity.

In these exemplary embodiments the heater 232 can be configured to heat the first gas to the first temperature and the second gas to the second temperature. For example, the heater 232 can heat the first and second gases before the gases flow past the skinned honeycomb body 100 before or after the blower 230. The heater 232 can be controlled by the controller 240 to heat the first and second gases. The heater 232 can be an induction, convection, or radiation heater such as IR 244, RF 246, microwave 248, etc. or a combination thereof.

In these exemplary embodiments ducting 250 may direct the blowing air 222 near the top of the chamber 226 through slits, openings, and the like (not shown) to control vertical air flow. Ducting, slits, openings, and the like (not shown) near the bottom of the chamber may likewise provide an exit for the flowing air to control vertical air flow substantially parallel with skinned honeycomb body channels 112, 112'. While the air flow 222 has been illustrated and described as directed from the top to the bottom of the chamber 226 and skinned honeycomb body 100, this disclosure is not so limited. That is, in these exemplary embodiments, the vertical air flow may be from the bottom to the top of the chamber 226 and skinned honeycomb body 100.

In these exemplary embodiments the system 224 can further include a humidifier 252 configured to humidify the first gas to the first relative humidity and humidify the second gas to the second relative humidity. For example, the humidifier 252 can humidify the first and second gases before the gases flow past the skinned honeycomb body 100 before or after the blower. The humidifier 252 can be controlled by the controller 240 to humidify the first and second gases. The humidifier 252 can be a warm steam, hot, cold, ultrasonic humidifier, etc. or a combination thereof.

In these exemplary embodiments the controller 240 can be configured to control the blower 230, heater 232, and humidifier 252, during a first period to uniformly dry the skin 124 on the skinned honeycomb body 100 to a first dryness greater than the skin critical dryness forming a partially dry skin and during a second period to dry the partially dry skin to a second dryness. In these exemplary embodiments the first time period can be less than about 120 minutes and the second time period can be less than about 120 minutes. For example, the first time period can be less than about 30 minutes and the second time period can be less than about 30 minutes.

In FIG. 10, the chamber 226 may have several zones, such as three zones Z-1, Z-2, and Z-3. The first drying zone Z-1 and the second drying zone Z-2 may be separated by a door or curtain 260. The second drying zone Z-2 and the third drying zone Z-3 may likewise be separated by a door or curtain 262. The first drying zone Z-1 may subject the skin on the skinned honeycomb body 100 to the gentle drying conditions until the skin is dried beyond its critical dryness. When the critical dryness 264 of the skin on the skinned honeycomb body is reached within a drying zone, for example, the first drying zone Z-1, the skin may continue to be dried under gentle conditions until the end of the drying zone. In the next drying zones, for example the second and third drying zones Z-2 and Z-3, the skin may be subjected to the harsh drying conditions. For example, the critical dryness 268 of the skin on the skinned honeycomb body may be reached within the second drying zone Z-2 when the first drying zone Z-1 and the second drying zone Z-2 subject the skin 124 on the skinned honeycomb body 100 to the gentle drying conditions. The skin may continue to be dried under gentle conditions until the end of the second drying zone Z-2. In the third drying zone Z-3 the skin may be subjected to the harsh drying conditions.

Some of the functional units described in this specification have been labeled as modules, controllers, and units in order to emphasize their implementation independence. For example, a module, controller or unit, herein after "module," may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. A module may also be implemented with valves, pistons, gears, connecting members, and springs, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

It will be apparent to those skilled in the art that various modifications and variations can be made in the disclosed exemplary embodiments without departing from the spirit or scope of the disclosure. Thus, it is intended that the appended claims cover the modifications and variations of this disclosure provided they come within the scope of the appended claims and their equivalents.

What is claimed is:

1. A method of drying a skin disposed on an outer periphery of a porous ceramic honeycomb body comprising a first end face, a second end face, and axial channels and the outer periphery extending from the first end face to the second end face, the method comprising:
    supporting the honeycomb body on the first end face such that the axial channels and the outer periphery are substantially vertical;
    drying the skin under a first set of conditions comprising flowing a first gas vertically to the honeycomb body at a first velocity, wherein at least a portion of the first flowing gas passes substantially equally around the outer periphery of the skin disposed on the outer periphery of the honeycomb body to uniformly dry the skin to a first dryness forming a partially dry skin that is less than 50% dry;
    drying the partially dry skin to a second dryness under a second set of conditions different from the first set of conditions,
    wherein the skin comprises an inorganic binder comprising an average particle size ($D_{50}$) in a range between 10 nm and 700 nm.

2. The method of claim 1, wherein the second set of conditions comprises flowing a second gas vertically to the honeycomb body at a second velocity greater than the first velocity to dry the skin to the second dryness.

3. The method of claim 2, wherein the first and second gases are air.

4. The method of claim 1, further comprising:
controlling the relative humidity of the atmosphere in which the skin is in contact under the first set of conditions to between about 10% and about 40% relative humidity; and
controlling the temperature of the atmosphere in which the skin is in contact under the first set of conditions to between about 40° C. and about 60° C.,
wherein the first gas is flowed at greater than about 2.0 m/s past the outer periphery of the skin.

5. The method of claim 1, wherein the second set of conditions comprises controlling the temperature of the atmosphere in which the skin is in contact to between about 60° C. and 150° C.

6. The method of claim 1, wherein the second set of conditions comprises subjecting the skin to at least one of flowing a second gas vertically to the honeycomb body at a second velocity greater than the first velocity, microwave radiation, and infrared radiation to dry the skin to the second dryness.

7. The method of claim 1, wherein the first set of conditions further comprises subjecting the skin to at least one of microwave radiation, radio frequency, and infrared radiation to dry the skin to the first dryness.

8. The method of claim 1, wherein the first dryness is between 20% dry and 50% dry and the second dryness is between about 80% dry and 100% dry.

9. The method of claim 8, further comprising drying the skin under the first set of conditions for less than about 120 minutes and drying the skin under the second set of conditions for less than about 120 minutes.

10. The method of claim 8, further comprising drying the skin under the first set of conditions for less than about 30 minutes and drying the skin under the second set of conditions for less than about 30 minutes.

11. The method of claim 1, further comprising controlling the temperature of the atmosphere in which the skin is in contact under the first set of conditions to between about 40° C. and about 60° C.

12. The method of claim 1, wherein the first conditions are relatively gentle drying conditions and the second conditions are relatively harsh drying conditions.

13. The method of claim 1, wherein air flow during the first conditions consists essentially of vertical air flow.

14. The method of claim 1, wherein the first dryness is less than 40% dry.

15. The method of claim 1, wherein the method prevents migration of the binder to an outer surface of the skin.

* * * * *